Sept. 15, 1942.                B. S. WILLIAMS                    2,295,983
                            AIR CONDITIONING SYSTEM
                              Filed Oct. 15, 1940
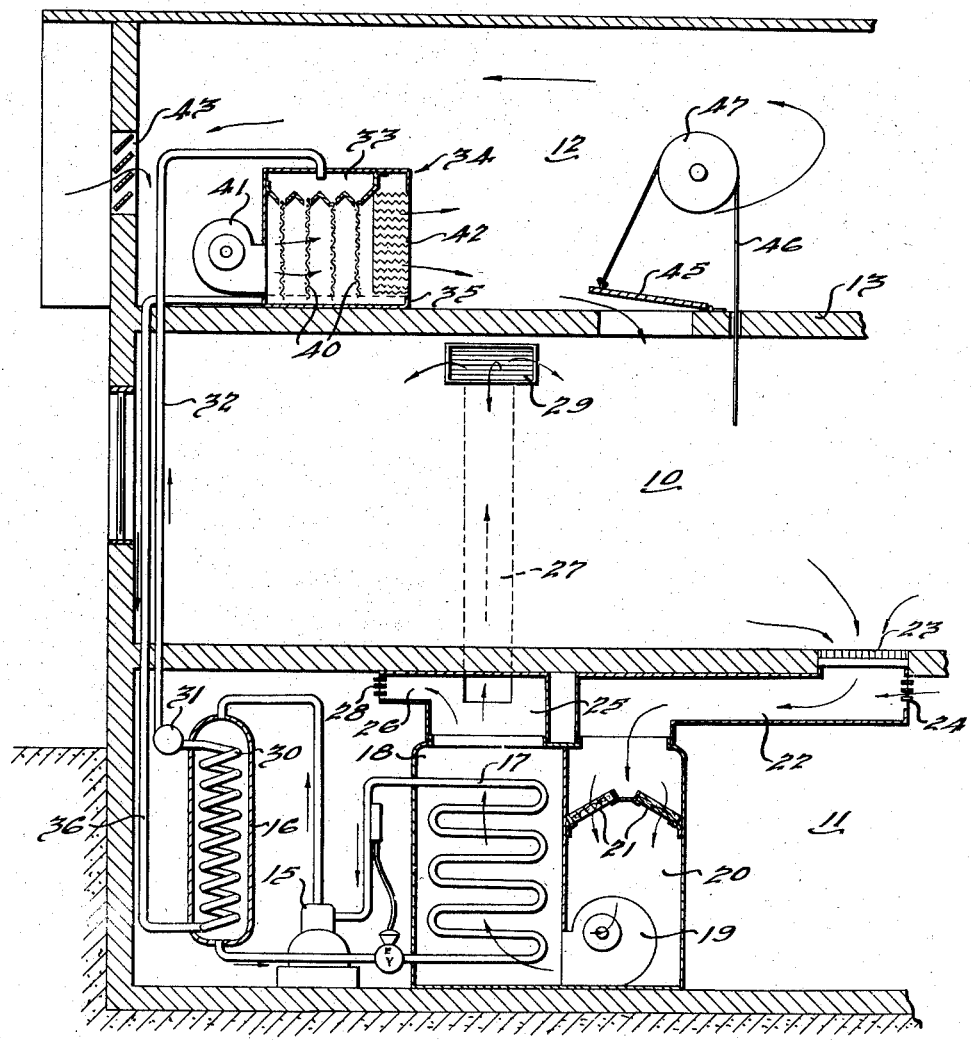
INVENTOR
Burdell S. Williams
BY
Harness, Lind, Patee & Harris
ATTORNEYS.

Patented Sept. 15, 1942

2,295,983

UNITED STATES PATENT OFFICE 2,295,983

AIR CONDITIONING SYSTEM

Burdell S. Williams, Dayton, Ohio, assignor to Chrysler Corporation, Detroit, Mich., a corporation of Delaware Application October 15, 1940, Serial No. 361,296

2 Claims. (Cl. 62—129)

This invention concerns a method and apparatus for air conditioning an enclosure having a quiescent air space subjected to heat load, such as an attic, adjacent thereto. The principal object of the invention is to lessen the heat load on the enclosure to be air conditioned by reducing the temperature of the quiescent air space and thus reducing the rate of heat transfer through the ceiling or walls of the enclosure. In carrying out the principal object of the present invention, it is found to be of advantage from the standpoint of economy of operation to air condition the enclosure by means of a mechanical heat transferring apparatus designed to transfer heat from the air of the enclosure to a fluid refrigerant and thence to cooling water used to condense the refrigerant, then to transfer the heat from the water to the air of the quiescent zone by passing the air in contact with the water, spreading the water over an extended surface in order to facilitate such heat transfer, and to circulate the air after contacting the water throughout the quiescent zone in contact with the confines of the space in which it is contained. By such operation the water is cooled sufficiently by the evaporative effect thereof to permit its reuse as a refrigerant condensing medium, and the air is lowered in sensible heat content so as to reduce the temperature gradient between the air of the enclosure to be conditioned and the air in the quiescent space, thus reducing the heat loss through the ceiling or dividing wall of the enclosure.

By way of example, the enclosure may be conditioned by a mechanical heat transferring system comprising means to circulate the air from and to the enclosure across the surface of a refrigerant evaporator connected to a compressor-condenser system, the condenser of which comprises a shell in which is situated a coil through which water is circulated by a pump. The temperature of the water is raised a few degrees by so cooling the refrigerant, and the water is then pumped to an evaporative cooler located in the attic space, which evaporative cooler comprises means to spread the water over an extended surface so as to cause considerable contact of the air in the attic space and the water, such as by means of sprays, trickle devices, screens, and the like. The air in the attic space is circulated over the extended surface of the water by an air propelling mechanism and recirculated again and again in contact with the water and the floor of the attic space. The water is cooled and again circulates through the condenser so as continuously to cool the refrigerant, and the air which has had its latent heat content materially increased is, nevertheless, more greatly reduced in sensible heat content so as to tend to reduce the heat loss through the ceiling of the enclosure. A typical example would be that water at 78° F. would be heated to 85° F. in the condenser, and then would be cooled to 78° F. in the evaporative cooler. The air in the attic space, which is subjected to the sun load and may be as high as 105° F. prior to initial operation of the air conditioning system, would have its sensible temperature drop to 80° F. by the action of the evaporative cooler, thus reducing the temperature gradient between the enclosure to be conditioned from 105° F. less the maintained condition, or approximately 30°, to a minimum of 80° F. less the maintained condition, or approximately 10°. Since the heat loss through a surface is a function of the temperature difference between the exterior and interior, it is obvious that a considerable savings in operating expense will be effected by such a system.

It is, of course, obvious that the present invention may be applied to adjoining areas, one area being air conditioned by the cooling apparatus and the other area adjacent thereto, whether it be overhead or along side the first area, to have the evaporative cooler associated therewith.

A secondary object of the present invention is to provide a system for air conditioning having the foregoing characteristics, objects, and advantages, which may be utilized to a partial extent only, as by means of circulating the water through the condenser coil and through the evaporative cooler without operation of the mechanical cooling system so as to cause sufficient reduction of temperature in the overhead or adjoining space to cool the enclosure on relatively mild days. In connection with the foregoing, it might be possible to open a connection between the normally quiescent zone and the enclosure so as to cause the introduction thereinto of cold air of relatively high humidity which might be desirable on relatively mild, dry days. Also, in connection with the foregoing it might be found desirable to operate the air circulator in the relatively quiescent zone without operation of the mechanical system or circulation of the water therethrough, in which case the air circulator would have the effect and advantages of an attic ventilator.

These and other objects of the present invention should be apparent from a study of the following specification taken in connection with the accompanying drawing showing a preferred form of the invention.

In the drawing, the enclosure to be air conditioned is generally designated by the numeral 10, it being apparent, of course, that the enclosure may comprise several rooms or spaces having common connection to the air conditioning mechanism, which is preferably located adjacent thereto as in the basement space 11. The enclosure is shown as adjoining a relatively quiescent zone, such as the attic space 12 overhead which is separated from the zone to be conditioned by the structure 13 which comprises the floor of the attic space or the ceiling of the enclosure.

The enclosure 10 is air conditioned by any accepted mechanical system, by way of example, there being shown a mechanical refrigerating system comprising a compressor 15, condenser 16, and evaporator 17, the compressor, condenser, and evaporator being associated in refrigerant flow relationship in accordance with principles and practices well known in the art. The evaporator 17 is located in a chamber 18 through which air is forced by a blower 19 located in an adjoining chamber 20 in which are situated air filters 21. Air is supplied to the blower 19 through a return air duct 22 communicating with the enclosure 10 through a return register 23, and air may also be supplied through a fresh air opening 24 communicating with the outdoors through some basement opening. The air which has been cooled and dehumidified by traversing the surfaces of the evaporator 17 in chamber 18 is forced into a plenum chamber 25 from which ducts, such as 26 and 27, lead the conditioned air to the enclosure to be conditioned through outlet registers such as registers 28 and 29. The foregoing description and the disclosure of a mechanical refrigerating system are solely by way of illustration and it is obvious that the mechanism and arrangement may be any of those accepted mechanisms and arrangements which have been found proper and satisfactory for air conditioning an enclosure.

In accordance with the present invention the refrigerant is cooled in the condenser shell 16 by water flowing through a coil 30 located in the shell 16, which water preferably flows in the contrary direction to the flow of refrigerant through the shell. The water is pumped from the coil 30 by pump 31 and through pipe 32 leading into the quiescent zone 12, which pipe terminates in a distributing tank 33 in an evaporative cooler 34. The water which is passed through the evaporative cooler is collected in the sump portion 35 and returned to the condenser coil through pipe 36. Make-up water may be supplied to the water circulating system by any convenient arrangement, such a device not being shown since many such devices are well known in the art.

The water which is distributed through distributing tank 33 may be spread out over an extended surface by any suitable means, such as by causing the water to drip through openings in the bottom of the tank 33 across the surfaces of a plurality of screens 40 extending vertically in the cooler casing. Air from the quiescent zone 12 is forced through the cooler and in contact with the water by a blower 41, the water being thereby cooled by the evaporation of a portion thereof, and the sensible heat content of the air being lowered while the latent heat content thereof is raised. The moisture laden air passes out of the evaporating cooler through a moisture eliminating device 42 of any well known construction and circulates throughout the extent of the space 12 in contact with the dividing structure 13. As previously explained, the temperature gradient between the interior and exterior is lessened so that the heat load on the enclosure is reduced, and hence the operating expense of the mechanical refrigerating system is reduced.

The space 12 is preferably provided with a louvered opening 43, or openings of similar character, through which fresh air may be drawn by the action of the blower 41 and some of the moisture laden air ejected by the pressure created within the space 12 so as to reduce the relative humidity of the air in the space and prevent the air from becoming totally saturated and thus ineffective.

As stated in the objects of the invention, it might be of advantage on some relatively mild days to operate the water circulating system without operation of the mechanical cooling system, in which event the reduction in temperature caused by cooling the ceiling 13 may be sufficient to create a feeling of comfort in the enclosure 10. Under some conditions it might be desirable to introduce some of the moisture laden air into the enclosure 10 in which case a trapdoor 45 in the ceiling 13 may be opened as by means of a rope 46 and pulley 47. It might also be found desirable on some occasions to operate the blower 41 without circulating water through the evaporating cooler 34, in which event the trapdoor 45 might remain open or closed as desired.

Having illustrated and described the preferred embodiment of my invention, it should be apparent to those skilled in the art that the same permits of modifications in arrangement and details. All such modifications as come within the scope of the following claims are to be considered a part of my invention.

I claim:

1. The method of air conditioning an enclosure having an attic space adjacent thereto comprising utilizing a heat transferring system employing a refrigerant for cooling the air of said enclosure and requiring the use of condenser cooling water, circulating the condenser cooling water through an evaporative cooler located in said attic space to be cooled therein and then returning the cooled water to the heat transferring system, circulating and recirculating continuously the air in said attic space through said evaporative cooler in contact with the water passing through said evaporative cooler in order to be cooled by evaporation of the water, freely circulating the cooled air emerging from said evaporative cooler in contact with the confines of said attic space in order to detract from the heat load of said enclosure, and continuously permitting the escape of part of the air from said attic space at a location near the air discharge side of said evaporative cooler and replacing the same with fresh air at a region near the air entrance side of said evaporative cooler in order to prevent saturation of the air in said attic space.

2. Air conditioning equipment for an enclosure having an attic space adjacent thereto comprising a mechanical air cooling and circulating system of the compressor-condenser-expander type employing forced draft for cooling the air of said enclosure, an evaporative cooler located in said attic space and having its air inlet opening and its air outlet opening communicating with said attic space, means to circulate water from the condenser of said air cooling system through said evaporative cooler and back to said condenser in order that said water may be cooled in said evaporative cooler and returned to the condenser of said system at a temperature such as to condense the refrigerant, said evaporative cooler comprising means for circulating air from said attic space through said evaporative cooler and thence in contact with the confines of said attic space in order to lessen the heat load on the enclosure by dropping the temperature gradient through the ceiling of the enclosure, an air inlet to said attic space in the region from which air is drawn into said evaporative cooler, and an air outlet from said attic space into the enclosure in the region into which air is discharged from said evaporative cooler, said inlet and outlet from said attic space permitting continuous replacement of part of the air in said attic space with fresh air in order to prevent saturation of the air in said attic space.

BURDELL S. WILLIAMS.